July 29, 1958 P. G. HEROLD 2,845,564

CATHODOLUMINESCENT PHOSPHORS AND DEVICES

Filed Feb. 26, 1957

INVENTOR.
PAUL G. HEROLD

BY [signature]

ATTORNEY

United States Patent Office 2,845,564

Patented July 29, 1958

2,845,564

CATHODOLUMINESCENT PHOSPHORS AND DEVICES

Paul G. Herold, Lancaster, Pa., assignor to Radio Corporation of America, a corporation of Delaware Application February 26, 1957, Serial No. 642,562

10 Claims. (Cl. 313—92)

Figures 1, 2, 3:
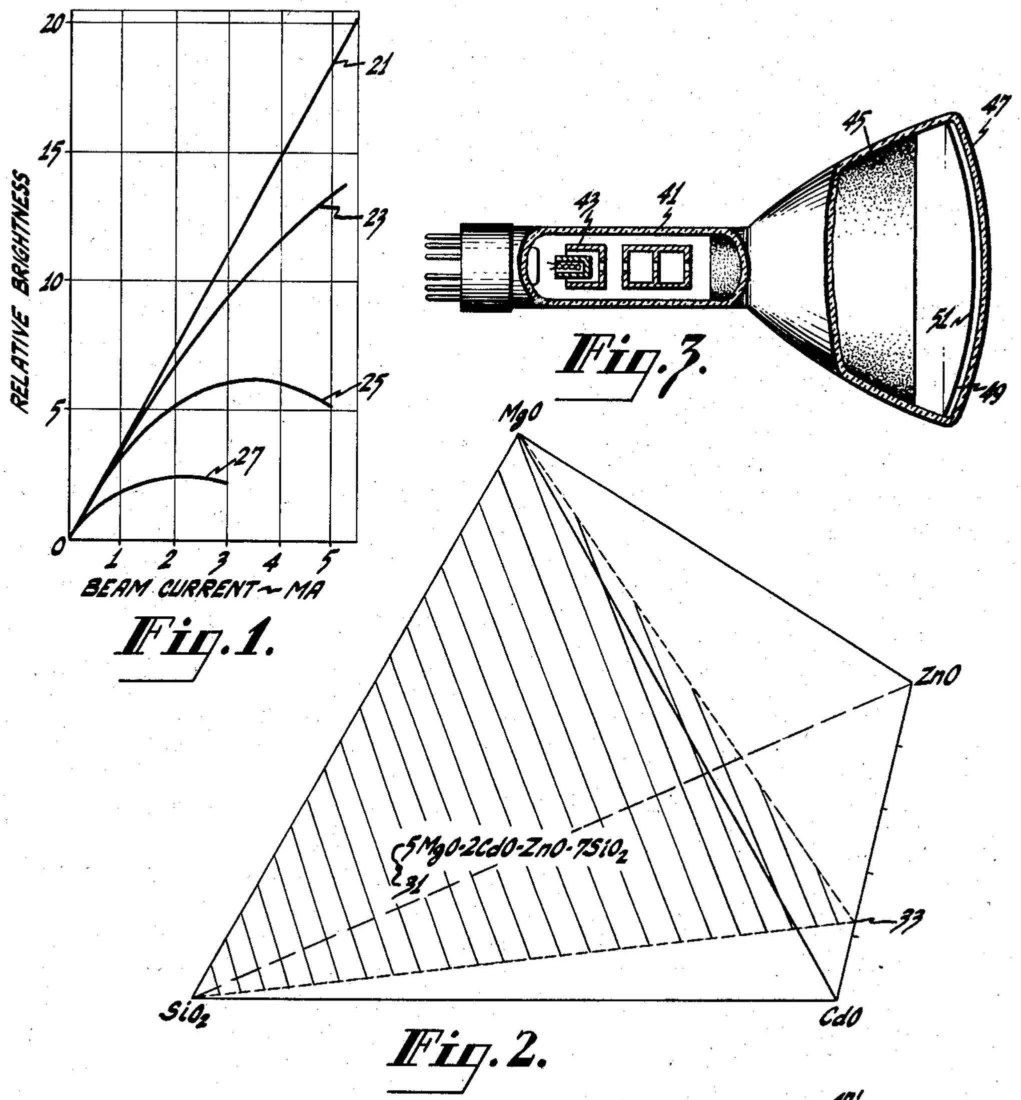

This invention relates to luminescence and particularly, but not necessarily exclusively, to a novel host crystal and to improved luminescent materials made therefrom. The invention includes also improved luminescent screens and kinescopes that are especially adapted for systems using high cathode beam currents and/or high accelerating voltages, such as in projection color television.

One type of projection color television system comprises three kinescopes, each of which is adapted to produce an image of a primary color. The primary color images are projected from these kinescopes and superimposed upon one another on a screen to produce the final composite color image. Each kinescope includes, an evacuated envelope, cathode ray producing means within and at one end of the envelope, a luminescent screen adapted to be excited by a cathode ray beam impinging thereon from said cathode ray producing means, and cathode ray deflecting means. The luminescent screen usually comprises a thin layer of a finely-divided luminescent material or phosphor. The emission properties of the kinescope, such as color, brightness, etc. are partly determined by the nature of the phosphor in the luminescent screen.

One of the primary color images of most color television systems is a red image. In order to provide satisfactory color television pictures, it is important to provide one of the kinescopes with a red-emitting luminescent screen having desirable emission characteristics. Some desirable characteristics are:

(1) *Proper emission color.*—The emission color of the screen should be a substantially monochromatic, saturated red, such that a color filter is not required. A color filter is undesirable because it reduces the efficiency of the kinescope by absorption of some of the light output, and because it is an additional bulky and expensive component that must be designed into the apparatus. Some previously used phosphors emit orange or yellow-orange images and require a color filter to eliminate the undesirable wavelengths of light. The emission color of the kinescope is of extreme importance in a color television system because white and intermediate colors are obtained by the addition of the three primary images. A careful balance of the primary colors is necessary to maintain true color fidelity. Also, a selection of the proper primary colors makes possible the production of the widest range of intermediate colors.

(2) *Freedom from color shift.*—The color of luminescence emission of some luminescent materials shifts with changes in cathode ray beam intensity. For example, the emission of many selenium-dominated phosphors shifts from red to yellow when higher cathode ray beam excitation intensities are used. Since the balance of primary color images is of extreme importance in color television, a shift of the color characteristics of one of the primary components upsets this balance.

(3) *Freedom from current saturation.*—It is highly desirable that the intensity of luminescence or brightness of the screen be a linear function of the amount of cathode ray energy which excites the phosphor. Most red-emitting phosphors that are presently used exhibit light intensities proportional to the cahtode ray beam strength over a limited range of beam strengths. However, when the phosphor excitation saturation point is reached, increased cathode ray intensity does not yield a proportionate increase in brightness. In some cases, further increase in current intensity produces a decreased brightness. Freedom from current saturation thus is desirable in order to simplify the conversion of the electrical signal into light, and in order to maintain maximum fidelity in color reproduction.

(4) *Resistance to burn.*—The brightness of many phosphors is permanently impaired when too much energy is uesd to excite the phosphor. This is sometimes referred to as radiation damage or "burn." To obtain pictures of maximum brightness with theatre projection tubes or similar tubes, it is necessary to use very high excitation energies on the luminescent screen. Hence, burn resistance, or resistance to radiation damage is extremely important in order to maintain high brightness, and to extend the useful life of the tube by several orders of magnitude.

Few red-emitting phosphors provide desirably high brightness in addition to all of the other above-described desirable characteristics. Emission from the boron-, sulfur- and selenium-dominated phosphors usually shifts from red to the shorter wavelengths with increased excitation intensity. The boron- and phopshrous-dominated phosphors usually have very poor burn resistance characteristics. The germanium-dominated phosphors usually exhibit an extremely low brightness. Most of the foregoing phosphor types and also most of the silicon-dominated phopshors usually are orange or yellow-orange emitters making it necessary to use a color filter to obtain the desired color. Many phosphor types, including most of the silicon- and sulfur-dominated phosphors, exhibit poor current saturation properties. Even zinc beryllium silicate with manganese activator, which is considered to be one of the best red-emitting phosphors, exhibits current saturation at relatively low excitation intensities.

One object of the invention is to provide a novel host crystal and improved luminescent materials made therefrom.

A further object is to provide improved red-emitting luminescent screens.

Another object is to provide luminescent screens with improved cathode current saturation properties and improved color shift properties under cathode ray excitation.

Another object is to provide improved cathode ray tubes and similar devices.

Another object is to provide improved red-emitting cahtode ray tubes that are particularly adapted for projection television purposes.

The invention is based on the discovery of a new compound in the four component system: magnesium oxide-cadmium oxide-zinc oxide silicon dioxide. The new compound has the approximate molar composition $5MgO.2CdO.ZnO.7SiO_2$ and is easily identified by a characteristic X-ray diffraction pattern hereinafter set forth. The new compound may be used as a host crystal for a phosphor or luminescent material. For example, the incorporation of 0.001 to 0.01 mole of manganese in the new compound yields a family of improved red-emitting cathodo-luminescent materials. This family of phosphors yields the same X-ray diffraction pattern as the host crystal. The phosphors of this family exhibit a peak cathodoluminescence at about 6380 A., are substantially free of color shift and current saturation over a very wide range of cathode current intensities, and are extremely resistant to radiation damage or "burn."

Because of the foregoing characteristics, the phosphors herein are particularly useful in the improved luminescent screens and improved cahtode ray tubes, which are especially adapted for use in applications where high excitation energies are used, as in projection television.

The luminescent screens herein include an improved phosphor herein, and may comprise a layer of uniform composition or a plurality of areas, such as parallel strips or circular areas.

The foregoing objects and other advantages are hereinafter more completely described by reference to the accompanying drawing in which:

Figure 1 is a graph showing a characteristic current saturation curve of a cathode ray tube including a luminescent material herein and, for purposes of comparison, characteristic curves of another cathode ray tube which includes a manganese-activated zinc veryllium silicate, Figure 2 is a section of a tetrahedral diagram illustrating the location of the new compound herein in the four component system: MgO—CdO—ZnO—$SiO_2$, Figure 3 is a partially schematic, partially sectional elevational view of a cathode ray tube having a luminescent screen comprising a luminescent material of the invention.

Figure 4:
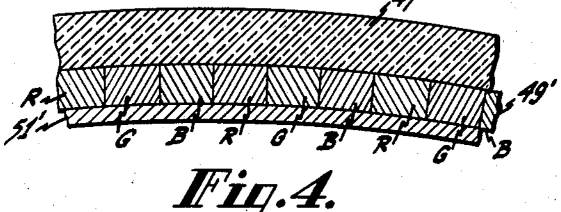
Figure 5:
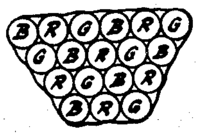

Figure 4 is a sectional view of the faceplate of a first tricolor kinescope in accordance with the invention, and Figure 5 is a partial elevational view of the faceplate of a second tricolor kinescope in accordance with the invention.

Similar reference characters are applied to similar elements throughout the drawing.

*Example 1*

A preferred luminescent material may be prepared as follows: A raw batch is prepared of the following ingredients:

| | |
|---|---|
| Magnesium oxide as the oxide | 0.50 mole. |
| Cadmium oxide as the carbonate | 0.20 mole. |
| Zinc oxide as the oxide | 0.10 mole. |
| Silicon dioxide as silicic acid | 0.70 mole. |
| Manganese as the sulfate | 0.04 mole. |
| Flux, as cadmium chloride | 10% by weight of the balance of the batch. |

The raw batch is milled with water from 4 to 24 hours, preferably 12 hours, in order to obtain intimate mixture of the ingredients.

The milled raw batch is dried, and then fired at about 1050° C. in a normal air atmosphere for about 4 hours. The fired material is cooled, and is then ready for use as a luminescent material. The luminescent material of Example 1 exhibits a single-banded cathodoluminescence in the visible region with its peak emission at about 6380 A. and relative freedom from shift of the peak emission wavelength with increased excitation intensities. It has the approximate composition $$5MgO.2CdO.ZnO.7SiO_2{:}0.04Mn$$

The phosphor of Example 1 consists essentially of a manganese-activated crystalline compound identified by the following unique X-ray diffraction pattern:

| Interplanar spacing: | Percent relative intensity |
|---|---|
| 4.61 | 29 |
| 4.46 | 58 |
| 3.56 | 26 |
| 3.53 | 13 |
| 3.32 | 10 |
| 3.21 | 84 |
| 3.04 | 100 |
| 2.93 | 80 |
| 2.91 | 29 |
| 2.58 | 59 |
| 2.49 | 66 |
| 2.46 | 24 |
| 2.37 | 12 |
| 2.23 | 31 |
| 2.18 | 19 |
| 2.15 | 43 |
| 2.13 | 12 |
| 2.06 | 24 |
| 2.02 | 11 |
| 1.95 | 11 |
| 1.83 | 11 |
| 1.79 | 19 |
| 1.76 | 20 |
| 1.68 | 13 |
| 1.63 | 37 |
| 1.55 | 16 |
| 1.50 | 22 |
| 1.47 | 13 |
| 1.39 | 20 |
| 1.28 | 13 |

A material prepared according to Example 1 but without the manganese activator exhibits the same X-ray diffraction pattern.

*Example 2*

The procedure of Example 1 may be varied by omitting the flux completely. A raw batch is prepared of the following ingredients:

| | Moles |
|---|---|
| Magnesium oxide, as the oxide | 0.50 |
| Cadmium oxide, as the carbonate | 0.20 |
| Zinc oxide, as the oxide | 0.10 |
| Silicon dioxide, as silicic acid | 0.90 |
| Manganese, as the sulfate | 0.06 |

The procedure is then the same as in Example 1. The product exhibits the same characteristics as the product of Example 1.

The proportion of the above ingredients may be varied considerably and still form a considerable amount of the new host crystal. Such variation in composition does, however, affect the cathodoluminescence of the product. For instance, the change of silica content from $$5MgO.2CdO.ZnO.7SiO_2 \text{ to } 5MgO.2CdO.ZnO.7.5SiO_2$$

causes a shift in the peak wavelength from 6380 A. U. to 6420 A. U. The proportion of manganese activator may be varied between 0.001 and 0.1 mole per mole of host crystal, preferably 0.04 mole. Other activators conventionally used in silicon-dominated phosphors may also be used to produce other cathodoluminescence emission characteristics.

The ingredients are preferably of the highest degree of purity obtainable. While oxides are preferred, other materials which decompose to yield oxides may be used in their place. For example, oxides, carbonates, bicarbonates, hydroxides and nitrates of the component elements may be used.

The raw batch may be fired for a period of between 1 and 15 hours. The firing atmosphere may be normal air. Useful luminescent materials of the invention are also produced by firing the raw batch in an oxidizing atmosphere in the presence of steam. The firing temperature may be varied between 800° C. and 1150° C.

Referring to Figure 1, if the luminescent material of Example 1 is incorporated in the luminescent screen of a 7" theatre projection kinescope and the tube is operated in its usual manner, curve 21 represents the relative brightness of the screen under standard television raster conditions as the cathode beam current is varied. The relationship between brightness of the emission and the excitation beam current is approximately linear, and no current saturation is observed up to and above 5 milliamperes. Curve 21 represents both the relative brightness upon initial excitation and also upon excitation over long periods of time after initial excitation under standard television raster conditions.

Zinc beryllium silicate with manganese activator, hitherto regarded as one of the phosphors most stable and least subject to non-linearity in current saturation characteristics exhibits relatively poor current saturation characteristics under the same conditions. Curve 23 represents the relative brightness as a function of cathode beam current upon initial excitation of a 7" tube having a luminescent screen consisting essentially of a zinc beryllium silicate with manganese activator. Curve 25 represents the relative brightness of the same zinc beryllium silicate screen after one minute of operation. Initially, this latter luminescent screen has an almost linear light output as a function of beam current. However, after continued operation over very short periods of time, the brightness decreases and current saturation is exhibited. In projection kinescopes where the luminescent screen is excited for long periods of time with high cathode ray beam intensities, the zinc beryllium silicate type phosphor screen may be used only within a very small range of cathode beam currents. The luminescent material of Example 1 exhibits a linear light output with varying cathode ray beam intensities over a range many times the linear range of the zinc beryllium silicate phosphor. At higher cathode ray beam intensities, the emission of the luminescent material of Example 1 is brighter than that provided by the zinc beryllium silicate phosphor.

The emission of manganese-activated zinc beryllium silicate is orange. The current saturation characteristics thereof are shown in curves 23 and 25. A color filter is necessary for its use as the red-emitting phosphor in a color television projection system. Curve 27 represents the relative brightness of the emission of the screen of curve 25 after it has passed through a Number 25 Wratten color filter. This color filter transmits approximately the same visual color as the luminescent screen of the curve 21. The relative brightness of the zinc beryllium silicate screen is considerably reduced due to the filtering of the shorter wavelengths by the color filter. A luminescent screen comprising the luminescent material of Example 1 exhibits a greater cathodoluminescence brightness, as shown by curve 21, over a wider current range and at higher beam currents than the filtered light output of the zinc beryllium silicate screen as shown by curve 27.

The new compound which is the host crystal for the phosphors herein is shown graphically by the point 31 in Figure 2. This point lies on the plane passing through the corner components $SiO_2$ and MgO and a point 33 comprising 24 weight percent ZnO and 76 weight percent CdO. When activated with manganese, the resulting phosphors exhibit a high relative brightness in conjunction with a peak cathodoluminescence emission at about 6380 A. These compositions exhibit the linear brightness characteristics illustrated in Figure 1. In addition, these compositions exhibit a high resistance to burn. A filter is not needed to produce required peak wavelengths.

Referring to Figure 3, a kinescope according to the invention comprises, for example, an evacuated envelope including a bulb 41 comprising a neck, a conical part and a glass faceplate 47, cathode ray producing means 43 of a conventional type at one end of said envelope, a second anode 45 comprising, for example, a conducting coating on a portion of the neck and conical part of the interior of the evacuated envelope, a thin layer 49 of the luminescent material of the invention coated on the interior surface of the faceplate 47, and an aluminum coating 51 superimposed upon the luminescent layer 49.

It is sometimes desirable to produce color television kinescopes having luminescent screens which comprise a plurality of areas having different emissions. One type of tricolor luminescent screen comprises strips of phosphors selectively excited to emit light of three different colors. The luminescent material of the instant invention may comprise the red component of such screens and kinescopes.

Referring to Figure 4, a section of a multicolor luminescent screen may comprise the faceplate 47', a luminescent layer 49', comprising strips of red-emitting phosphor, R, green-emitting phosphor, G, and blue-emitting phosphor, B, and an aluminum coating 51', superimposed upon the luminescent layer 49'. The red-emitting phosphor of the layer 49' may be a red-emitting phosphor of the invention. The green-emitting phosphor may be, for example, Zinc silicate with manganese activator or zinc sulphide with copper activator and the blue-emitting phosphor may be, for example, zinc sulphide with silver activator or calcium magnesium silicate with titanium activator.

Referring to Figure 5, a multicolor luminescent screen may comprise a plurality of adjacent circular areas of red-emitting phosphor, R, green-emitting phosphor, G, and blue-emitting phosphor, B, arranged as trios. This general type of screen is commonly used in a tricolor kinescope. The red-emitting phosphor may be a luminescent material of the invention. The blue- and green-emitting phosphors may be any of the phosphors used in the luminescent screens of Figure 4.

Although the discussion of multicolor luminescent screens has been limited to "line" screens of Figure 4 and "dot" screens of Figure 5, the phosphor areas of the screens may be prepared in any geometrical arrangement or order. Similarly, multicolor screens may comprise any convenient combination of red-emitting areas using the phosphors described herein and areas of any other color of emission to suit the engineering design.

The compositions described herein belong to the general system disclosed in U. S. Patent Nos. 2,306,270 and 2,306,271 to Humboldt W. Leverenz. The present invention includes luminescent screens, and cathode ray tubes having luminescent screens, which include the improved phosphor herein and which exhibit improved cathode current saturation characteristics under standard television raster conditions.

The luminescent screens and cathode ray tubes herein are particularly well adapted for use wherever relatively high cathode currents are used to produce a red emission. Examples of such use are in kinescopes for projection television, in direct view kinescopes of the focus mask type and in similar devices. These devices may be used in theatre projection systems or for use in the home. The luminescent screens of the invention may comprise a uniform composition such that a monochromatic red emission is obtained, or the screen may comprise a plurality of red, green, and blue-emitting areas such that a polychromatic image is obtained. Any geometrical arrangement of red, green and blue areas may be used, for example, as an array of parallel adjacent strips or as an array of tangent circular areas.

There has been described a novel compound which may be the host crystal for improved red-emitting luminescent materials. Luminescent screens prepared with these materials exhibit good current saturation properties under cathode ray excitation, high resistance to burn, and relative freedom from color shift. There have also been described improved red-emitting luminescent screens and kinescopes which are particularly well adapted for purposes which utilize high cathode ray excitation intensities for relatively long periods of time.

What is claimed is:

1. A luminescent screen including a support and a coating thereon, said coating comprising a luminescent material having the approximate molar composition $5MgO.2CdO.ZnO.7SiO_2{:}x Mn$, where $x=0.001$ to 0.1.

2. A luminescent screen including a support and a coating thereon, said coating comprising a luminescent material having the approximate molar formula $$5MgO.2CdO.ZnO.7SiO_2{:}0.04\,Mn$$

3. A luminescent screen comprising a support and a coating thereon, said coating comprising a luminescent material consisting of a manganese-activated magnesium-cadimum-zinc silicate having a peak cathodoluminescence at about 6380 A. and which produces an X-ray diffraction pattern having lines of maximum intensity corresponding to the following interplanar spacings:

| Interplanar spacing: | Percent relative intensity |
|---|---|
| 4.61 | 29 |
| 4.46 | 58 |
| 3.56 | 26 |
| 3.53 | 13 |
| 3.32 | 10 |
| 3.21 | 84 |
| 3.04 | 100 |
| 2.93 | 80 |
| 2.91 | 29 |
| 2.58 | 59 |
| 2.49 | 66 |
| 2.46 | 24 |
| 2.37 | 12 |
| 2.23 | 31 |
| 2.18 | 19 |
| 2.15 | 43 |
| 2.13 | 12 |
| 2.06 | 24 |
| 2.02 | 11 |
| 1.95 | 11 |
| 1.83 | 11 |
| 1.79 | 19 |
| 1.76 | 20 |
| 1.68 | 13 |
| 1.63 | 37 |
| 1.55 | 16 |
| 1.50 | 22 |
| 1.47 | 13 |
| 1.39 | 20 |
| 1.28 | 13 |

4. A luminescent screen including a base and a coating thereon, said coating comprising a plurality of blue-emitting areas, a plurality of green-emitting areas and a plurality of red-emitting areas, said red-emitting areas comprising a luminescent material consisting essentially of a manganese-activated magnesium-cadmium-zinc silicate having a peak cathodoluminescence at about 6380 A. and which produces an X-ray diffraction pattern having lines of maximum intensity corresponding to the following interplanar spacings:

| Interplanar spacing: | Percent relative intensity |
|---|---|
| 4.61 | 29 |
| 4.46 | 58 |
| 3.56 | 26 |
| 3.53 | 13 |
| 3.32 | 10 |
| 3.21 | 84 |
| 3.04 | 100 |
| 2.93 | 80 |
| 2.91 | 29 |
| 2.58 | 59 |
| 2.49 | 66 |
| 2.46 | 24 |
| 2.37 | 12 |
| 2.23 | 31 |
| 2.18 | 19 |
| 2.15 | 43 |
| 2.13 | 12 |
| 2.06 | 24 |
| 2.02 | 11 |
| 1.95 | 11 |
| 1.83 | 11 |
| 1.79 | 19 |
| 1.76 | 20 |
| 1.68 | 13 |
| 1.63 | 37 |
| 1.55 | 16 |
| 1.50 | 22 |
| 1.47 | 13 |
| 1.39 | 20 |
| 1.28 | 13 |

5. A cathodoluminescent screen according to claim 4 wherein said areas comprise an array of parallel strips adjacent one another.

6. A cathodoluminescent screen according to claim 4 wherein said areas comprise an array of circular areas that are tangent to one another.

7. A cathodoluminescent screen according to claim 4 wherein said red-emitting areas comprise a luminescent material having the approximate molar composition $$5MgO.2CdO.ZnO.7SiO_2{:}0.04\,Mn$$

8. A luminescent material having the approximate molar formula $5MgO.2CdO.ZnO.7SiO_2{:}x Mn$, where $x=0.0001$ to 0.1 mole.

9. A luminescent material having the approximate molar formula $5MgO.2CdO.ZnO.7SiO_2{:}0.04\,Mn$.

10. A manganese-activated magnesium-cadmium-zinc silicate having a peak cathodoluminescence at about 6380 A. and which produces an X-ray diffraction pattern having lines of maximum intensity corresponding to the following interplanar spacings:

| Interplanar spacing: | Percent relative intensity |
|---|---|
| 4.61 | 29 |
| 4.46 | 58 |
| 3.56 | 26 |
| 3.53 | 13 |
| 3.32 | 10 |
| 3.21 | 84 |
| 3.04 | 100 |
| 2.93 | 80 |
| 2.91 | 29 |
| 2.58 | 59 |
| 2.49 | 66 |
| 2.46 | 24 |
| 2.37 | 12 |
| 2.23 | 31 |
| 2.18 | 19 |
| 2.15 | 43 |
| 2.13 | 12 |
| 2.06 | 24 |
| 2.02 | 11 |
| 1.95 | 11 |
| 1.83 | 11 |
| 1.79 | 19 |

| Interplanar spacing: | Percent relative intensity |
|---|---|
| 1.76 | 20 |
| 1.68 | 13 |
| 1.63 | 37 |
| 1.55 | 16 |
| 1.50 | 22 |
| 1.47 | 13 |
| 1.39 | 20 |
| 1.28 | 13 |

References Cited in the file of this patent

UNITED STATES PATENTS

| | | |
|---|---|---|
| 2,542,360 | Roos | Feb. 20, 1951 |
| 2,633,547 | Law | Mar. 31, 1953 |
| 2,690,518 | Fyler et al. | Sept. 28, 1954 |
| 2,802,964 | Jesty | Aug. 13, 1957 |

OTHER REFERENCES

Larach: "Cathodoluminescence . . . ," Journal of the Electrochemical Society, pages 370–371, September 1951.